(12) United States Patent
Izutsu et al.

(10) Patent No.: US 6,416,722 B1
(45) Date of Patent: Jul. 9, 2002

(54) DESULFURIZING METHOD AND APPARATUS BY IRRADIATION OF ELECTRON BEAM

(75) Inventors: Masahiro Izutsu; Yoshitaka Iizuka, both of Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/594,550

(22) Filed: Jun. 15, 2000

Related U.S. Application Data

(63) Continuation of application No. 09/125,783, filed as application No. PCT/JP97/00604 on Feb. 28, 1997, now Pat. No. 6,093,288.

(30) Foreign Application Priority Data

Mar. 1, 1996 (JP) .............................................. 8-68958

(51) Int. Cl.[7] ................................................. B01J 19/08
(52) U.S. Cl. .................................. 422/186.04; 422/186
(58) Field of Search ........................... 422/186, 186.04, 422/186.11; 204/157.3

(56) References Cited

U.S. PATENT DOCUMENTS

| | | | | |
|---|---|---|---|---|
| 4,882,020 A | * | 11/1989 | Maezawa et al. | 204/157.3 |
| 5,244,552 A | | 9/1993 | Namba et al. | |
| 5,547,643 A | * | 8/1996 | Nomoto et al. | 422/186.04 |
| 5,695,616 A | * | 12/1997 | Helfritch et al. | 204/157.3 |
| 5,834,722 A | * | 11/1998 | Tokunaga et al. | 204/157.3 |

* cited by examiner

Primary Examiner—Donald R. Valentine
Assistant Examiner—Thao Tran
(74) Attorney, Agent, or Firm—Oblon, Spivak, McClelland, Maier & Neustadt, P.C.

(57) ABSTRACT

A high temperature gas containing sulfur oxides is desulfurized by converting sulfur oxides to ammonium compounds by the injection of ammonia and irradiation with an electron beam. The high temperature gas containing the sulfur oxides is cooled by contacting the gas with recirculated cooling water, then mixed with ammonia, air, and water and irradiated with an electron beam.

9 Claims, 3 Drawing Sheets

DESULFURIZING METHOD AND APPARATUS BY IRRADIATION OF ELECTRON BEAM

This application is a Continuation of U.S. application Ser. No. 09/125,783, filed Aug. 27, 1998, now U.S. Pat. No. 6,093,288 which was the National Stage of International Application No. PCT/JP97/00604, filed Feb. 28, 1997.

TECHNICAL FIELD

The present invention relates to a desulfurizing process and apparatus by irradiation of electron beam, and more particularly to a process and an apparatus for desulfurization by injection of ammonia into a high temperature gas containing sulfur oxides such as a combustion flue gas discharged from a boiler and irradiation of electron beam.

BACKGROUND ART

As economy develops, more and more energy is demanded. Amidst the continuous growth of energy demand, energy source is still dependent on fossil fuels such as coal and petroleum. However, the harmful products or pollutants generated by the burning of fossil fuels are responsible for global pollution. To prevent the release of pollutants into the atmosphere and to stop the pollution of global environment, development work is being carried out at an accelerated pace to create a flue gas treatment system for installation in fuel combustion plant such as thermal power plants. There are still many areas of improvement to meet problems such as the complicated configuration of the equipment requiring a large number of control variables and the need for large-scale waste water treatment systems requiring sophisticated treatment technology.

In an effort to solve these problems, a flue gas treatment system in which flue gas discharged from the fuel combustion facility such as a boiler is treated by irradiation of electron beam has been developed.

In this system, ammonia is injected into a high temperature gas containing sulfur oxides, and the mixed gas is irradiated with electron beam to remove the sulfur oxides therefrom in the form of a powder of ammonium compounds. In this case, the lower the temperature of gas is, the higher the reaction rate between sulfur oxides and ammonia is. Therefore, the high temperature gas is required to be cooled to a certain range of temperature. Accordingly, conventionally, the gas is normally cooled to a temperature ranging from an adiabatic saturation temperature plus 10° C. to 80° C. by water spray at the top of a cooling tower which is located in the system upstream of a process vessel in which ammonia is injected. The cooling tower is a complete evaporating type in which the sprayed water is completely evaporated. The gas cooling system has such an advantage that no waste water treatment system is required to be installed because of generation of no waste water. Further, by controlling the amount of sprayed water, the temperature of gas discharged from the cooling tower can be adjusted.

However, if the concentration of sulfur oxides is relatively large and/or the dose of electron beam is relatively large, an increase of the gas temperature caused by the heat of reaction between sulfur oxides and ammonia and/or by the heat generation due to irradiation of electron beam is not negligible. Therefore, in order to avoid lowering the reaction rate due to an increase of the gas temperature, after cooling of the gas in the cooling tower, it is necessary to adjust the gas temperature in the range of 50 to 80° C. by water spray in a process vessel. At this time, the sprayed water is completely evaporated in the process vessel or in the subsequent stage, and hence waste water is not generated in the process vessel as well (hereinafter suppression of an increase of the gas temperature by evaporation of sprayed water in the process vessel is referred to as "secondary gas cooling", and the cooling of the gas before the reaction step is referred to as "primary gas cooling").

FIG. 3 is a schematic view of a conventional electron beam flue gas treatment system. As shown in FIG. 3, flue gas containing sulfur oxides discharged from a boiler 1 which is a kind of fuel combustion facility is cooled in a heat exchanger 2, and then introduced into a cooling tower 4. In the cooling tower 4, water supplied from a pump 3 is sprayed by a single-fluid nozzle 6, and the sprayed water is completely evaporated therein. The cooling tower 4 is a complete evaporating type in which the sprayed water is completely evaporated. The flue gas is cooled to a certain range of temperature in the cooling tower 4, and then the cooled gas is introduced into a process vessel 5.

On the other hand, ammonia supplied from an ammonia supply equipment 9 is mixed with air in a line mixer 10. The mixed gas and water supplied from a water supply source (not shown) are mixed in a gas-liquid mixing room of a two-fluid nozzle 11, and sprayed at the entrance of the process vessel 5. The mixture of the gas and water are irradiated with electron beam from an electron accelerator 12.

According to the conventional method in which the primary gas cooling is conducted in a complete evaporating type cooling tower, a gas retention time of 10 to 30 seconds in the cooling tower is required to evaporate the sprayed water completely in the cooling tower. This causes the problems that a large volume cooling tower is needed, and a high construction cost of the cooling tower and a large space for the cooling tower are required. It is possible to decrease the volume of the cooling tower by decreasing the diameter of the droplets of the sprayed water. However, this method is problematic in that more power is required for atomization of the water into fine droplets.

DISCLOSURE OF THE INVENTION

It is therefore an object of the present invention to solve the above problems, and to provide a desulfurizing process and apparatus which can reduce greatly a gas retention time in a cooling tower, a volume of the cooling tower, a construction cost of the cooling tower and an installation space for the cooling tower without increasing the required power, while maintaining advantages of being free from waste water in the conventional method.

In order to achieve the above object, the inventors of the present application proposes a method in which the primary gas cooling is conducted by contacting the gas with recirculating cooling water (hereinafter referred to as "water recirculating cooling method"). In this case, the gas retention time in the cooling tower is reduced significantly to 0.1 to 5 seconds, and hence the volume of the cooling tower may be extremely small, and the construction cost and the installation space of the cooling tower may be significantly decreased. Further, since there is no need for atomization of the water, the required power can be lessened. However, since sulfur oxides, soot or dust contained in the gas is captured in the recirculating cooling water, it is necessary to partially withdraw water from the recirculating cooling water to stabilize cooling of gas. The withdrawn water, which is waste water, is discharged to the environment after necessary treatment. This fails to maintain the advantages that the process is free from waste water in the conventional technique. Therefore, the inventors of the present application have investigated further, and have invented a novel method in which the water withdrawn partially from the recirculating cooling water is used for the secondary gas cooling.

According to one aspect of the present invention, there is provided a desulfurizing process in which a high temperature gas containing sulfur oxides is processed to remove sulfur oxides by converting the sulfur oxides into ammonium compounds with injection of ammonia and irradiation of electron beam, the process comprising the steps of: cooling the high temperature gas by being contacted with recirculating cooling water to obtain a cooled gas; withdrawing a portion of the recirculating cooling water; spraying the withdrawn water or the withdrawn water that is diluted with water into the cooled gas before, or simultaneously with, or after injection of ammonia, or by mixing with ammonia into the cooled gas; and evaporating the sprayed water completely.

With the above process, an increase of the gas temperature caused by the heat of reaction between sulfur oxides and ammonia and/or by the heat generation due to irradiation of electron beam is suppressed, and the gas temperature at the outlet of the process vessel is adjusted in the range of 50 to 80° C. so that no waste water is generated. It is preferable to filter the water withdrawn partially from the recirculating cooling water before it is sprayed in the process vessel.

Further, in the conventional technique, the cooling tower is required to be extremely large in volume to cool the gas to an adiabatic saturation temperature plus 10° C. or less. In contrast thereto, in the present invention, by controlling the recirculating flow rate of the recirculating cooling water, the gas temperature at the outlet of the cooling tower can be adjusted in the range from the adiabatic saturation temperature to 80° C. suitable for reaction.

The amount of sprayed water required for the secondary gas cooling depends on the gas temperature before the secondary gas cooling, the gas temperature to be achieved by the secondary gas cooling, the heat of reaction, and the dose of electron beam. In order not to generate waste water, it is necessary that the amount of water withdrawn partially from the recirculating cooling water is equal to or less than the amount of sprayed water required for the secondary gas cooling. In the case where sulfur oxide concentration is 100 ppm or more and/or the dose of electron beam is 2 kGy or more, the amount of sprayed water required for the secondary gas cooling becomes large, and the amount of sprayed water required for the secondary gas cooling is sufficiently larger than that of the withdrawn water from the recirculating cooling water, and hence the present invention is particularly suitable for such cases.

According to another aspect of the present invention, there is provided a desulfurizing apparatus in which ammonia is injected into a high temperature gas containing sulfur oxides and mixed gas is irradiated with electron beam to remove sulfur oxides in the form of a powder of ammonium compounds, the apparatus comprising: a gas cooling device for cooling the high temperature gas by being contacted with recirculating cooling water to obtain a cooled gas; an ammonia injecting device for injecting ammonia into the cooled gas; and a spraying device located upstream of, at the same position as, or downstream of the ammonia injecting device, for spraying water withdrawn from the recirculating cooling water, or withdrawn water that is diluted with water into the cooled gas.

According to still another aspect of the present invention, there is provided a desulfurizing apparatus in which ammonia is injected into a high temperature gas containing sulfur oxides and mixed gas is irradiated with electron beam to remove sulfur oxides in the form of a powder of ammonium compounds, the apparatus comprising: a gas cooling device for cooling the high temperature gas by being contacted with recirculating cooling water to obtain a cooled gas; a mixing device for mixing ammonia with water withdrawn from the recirculating cooling water, or with withdrawn water that is diluted with water; and a spraying device for spraying a mixture of ammonia and the withdrawn water or a mixture of ammonia and diluted withdrawn water into the cooled gas.

According to still another aspect of the present invention, there is provided a desulfurizing apparatus in which ammonia is injected into a high temperature gas containing sulfur oxides and mixed gas is irradiated with electron beam to remove sulfur oxides in the form of a powder of ammonium compounds, the apparatus comprising: a gas cooling device for cooling the high temperature gas by being contacted with recirculating cooling water to obtain a cooled gas; and a gas-liquid mixture spraying device for mixing ammonia or a mixture of ammonia and air, with water withdrawn from the recirculating cooling water or withdrawn water that is diluted with water and spraying a gas-liquid mixture produced by the mixing into the cooled gas.

In the above apparatus, it is preferable to provide a filtering device for filtering the water withdrawn partially from the recirculating cooling water in the following stage of the gas cooling device.

In the present invention, the amount of water withdrawn partially from the recirculating cooling water is adjusted so that pH of the recirculating cooling water is in the range of 1 to 7, preferably 1 to 6. Alternatively, pH of the recirculating cooling water is adjusted to be in the range of 1 to 7, preferably 1 to 6 by the addition of at least one of alkaline compounds selected from the group consisting of ammonia, sodium compounds, potassium compounds, calcium compounds and magnesium compounds. The water withdrawn partially from the recirculating cooling water is adjusted to have pH of from 1 to 8, preferably from 1 to 7, by the addition of at least one of alkaline compounds selected from the group consisting of ammonia, sodium compounds, potassium compounds, calcium compounds and magnesium compounds, or by dilution with water. Soft water may be used as make-up water for the recirculating cooling water of the gas cooling device, i.e., the cooling tower. A hydroxide, oxide or carbonate of sodium, potassium, calcium, magnesium and the like can be used as the alkaline compounds.

BEST MODE OF FOR CARRYING OUT THE INVENTION

Embodiments of the present invention will be described below in detail.

Figure 1:
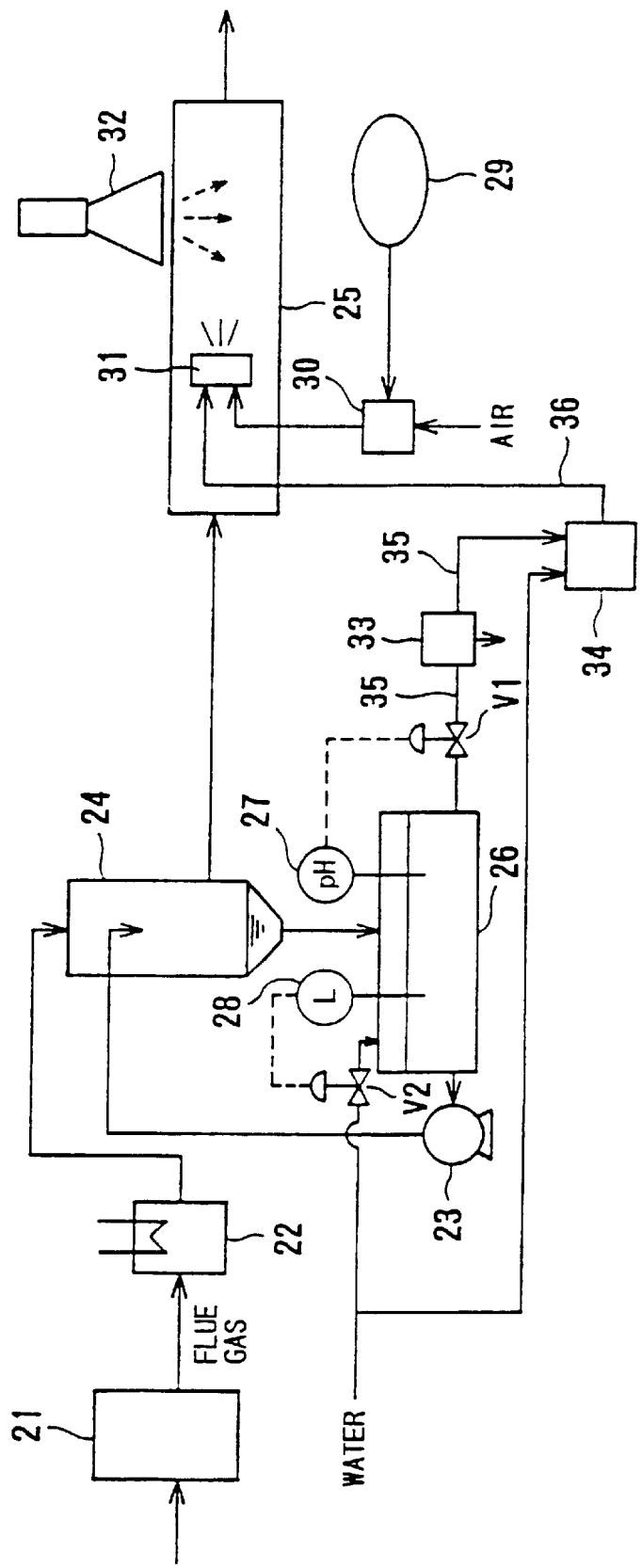
FIG. 1 is a process flow diagram showing a desulfurizing process according to an embodiment of the invention.

FIG. 1 is a schematic view of a first embodiment of the present invention. As shown in FIG. 1, flue gas containing sulfur oxides discharged from a boiler 21 which is a kind of fuel combustion facility is cooled in a heat exchanger 22, and then introduced into a cooling tower 24. The cooling tower 24 is a water recirculating type cooling tower in which cooling water is recirculated by a recirculation pump 23. In the cooling tower 24, the flue gas is cooled to a temperature ranging from an adiabatic saturation temperature to 80° C. by controlling the recirculating flow rate of the recirculating cooling water which is recirculated by the recirculation pump 23. At this time, by controlling a valve V1, the water is withdrawn partially from a recirculation water tank 26 through a water withdrawing line 35 so that pH of the recirculating cooling water is adjusted to be in the range of 1 to 7, preferably 1 to 6 on the basis of a signal from a pH meter 27. By controlling a valve V2, water is supplied to a recirculation water tank 26 as make-up water so that the level of the recirculation water tank 26 is controlled to be kept constant on the basis of a signal from a level gauge 28. In this manner, the flue gas cooled by the cooling tower 24 is introduced into a process vessel 25.

On the other hand, the withdrawn water from the recirculation water tank 26 is filtered by a filter 33, and mixed with water supplied from a water supply source (not shown) in a mixing tank 34 to adjust pH of the withdrawn water, and then introduced into a two-fluid nozzle 31 in the process vessel 25 through an secondary cooling water line 36. Ammonia supplied from an ammonia supply equipment 29 is mixed with air in a line mixer 30, and the mixed gas is introduced into the two-fluid nozzle 31. In the two-fluid nozzle 31, the mixed gas from the line mixer 30 and the withdrawn water from the secondary cooling water line 36 are mixed in a gas-liquid mixing room thereof, and sprayed at the entrance of the process vessel 25, and then a mixture of the gas and the water is irradiated with electron beam from an electron accelerator 32. Under the influence of the electron beam, the sulfur oxides contained in the flue gas are oxidized in a short time with the formation of sulfuric acid ($H_2SO_4$) as an intermediate. This acid is neutralized by the ammonia that is present in the process vessel 25 to produce pulverous byproduct including ammonia sulfate (($NH_4)_2SO_4$).

Figure 2:
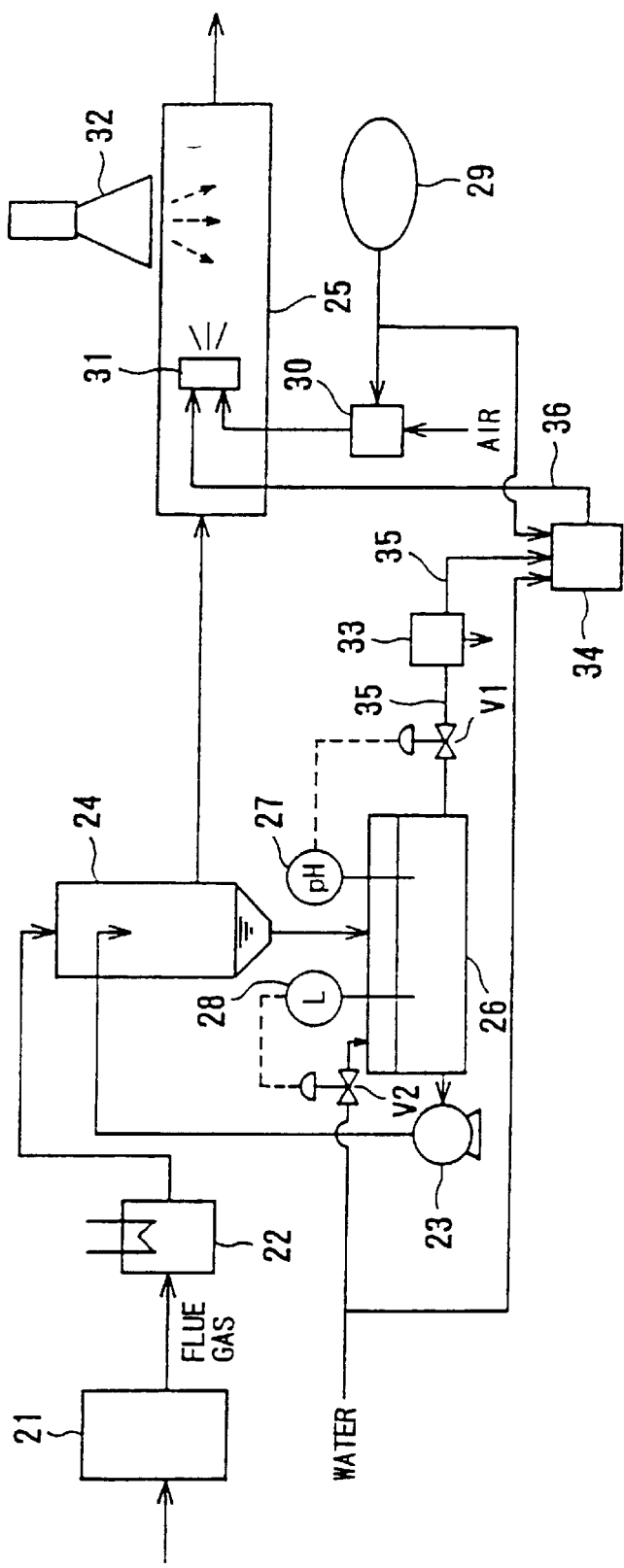
FIG. 2 is a process flow diagram showing a desulfurizing process according to another embodiment of the invention.

FIG. 2 is a process flow diagram according to a second embodiment of the present invention. In the second embodiment of FIG. 2, the same portions and components as those shown in the first embodiment of FIG. 1 are denoted at the same reference numerals. In this embodiment, ammonia from the ammonia supply equipment 29 is injected into a mixing tank 34. That is, the withdrawn water from the recirculation water tank 26, water from a water supply source (not shown), and ammonia from the ammonia supply equipment 29 are supplied to the mixing tank 34 in which pH of the mixed water is adjusted, and then the mixture is supplied to the two-fluid nozzle 31. The other structure of the second embodiment shown in FIG. 2 is the same as the first embodiment shown in FIG. 1.

As shown in FIGS. 1 and 2, cooling of the gas can be conducted by a separate gas cooling device comprising the cooling tower 24 upstream of the process vessel 25. It is also possible to provide a gas cooling section in the process vessel on the upstream side of the ammonia injection section, because the required retention time of the gas is short.

It is necessary that the amount of the withdrawn water from the recirculating cooling water is equal to or less than the amount of water required for the secondary gas cooling to completely eliminate generation of waste water. If the amount of the withdrawn water is less than the amount of water required for the secondary gas cooing, water is added to the withdrawn water, and the mixed water is sprayed. If the amount of the withdrawn water is in excess of the amount of water required for the secondary gas cooling, a portion of the withdrawn water is sprayed in the process vessel and the remaining portion of the withdrawn water will be waste water. Even if the amount of withdrawn water is in excess, the process is successful in reducing the amount of waste water.

In order to evaporate the withdrawn water completely, it is common to use as a spray nozzle a nozzle having a passage of a small diameter to obtain fine droplets for spraying. If the high temperature gas contains not only sulfur oxides but also soot and dust, the soot and dust are captured by the recirculating cooling water in the recirculating cooling system. Therefore, it is preferable to spray the withdrawn water after it is filtered by the filter 33 to remove the soot and dust therefrom and to prevent clogging of the passage of the nozzle as shown in FIGS. 1 and 2.

If the concentration of sulfur trioxide is relatively high among the sulfur oxides in the gas, and if the gas is cooled by a water recirculating cooling system, sulfur trioxide is dissolved in the recirculating cooling water and lowers pH of the recirculating cooling water. This may cause corrosion of the cooling tower 24, the recirculation pump 23, the recirculation water tank 26, a pipe line connecting the recirculation pump 23 and the cooling tower 24, a pipe line connecting the cooling tower 24 and the recirculation water tank 26, a pipe line connecting the recirculation water tank 26 and the recirculation pump 23, the water withdrawing line 35, the secondary cooling water line 36 and the two-fluid nozzle 31. The corrosion is liable to progress when pH is less than 1. Therefore, it is preferable to keep pH at 1 or above. This is achieved by increasing the amount of water withdrawn partially from the recirculating cooling water. It is also possible to adjust pH of the recirculating cooling water by adding alkaline compounds such as ammonia, sodium compounds, potassium compounds, calcium compounds or magnesium compounds to the recirculating cooling water. These alkaline compounds may be added to the withdrawn water which is withdrawn partially from the recirculating cooling water. It is also possible to adjust pH of the recirculating cooling water by diluting it with additional water.

If the amount of alkaline compounds such as ammonia, sodium compounds, potassium compounds, calcium compounds or magnesium compounds is too high, and the recirculating cooling water becomes alkaline, and if the high temperature gas such as flue gas discharged from a boiler contains carbon dioxide, carbon dioxide which is not intended to be removed is dissolved in the cooling water. If alkaline compounds such as ammonia, sodium compounds, potassium compounds, calcium compounds or magnesium compounds are added to the recirculating cooling water, and the recirculating cooling water is made alkaline, the recirculating cooling water absorbs sulfur oxides and becomes a solution of salts such as sodium sulfate and/or sodium sulfite, potassium sulfate and/or potassium sulfite, calcium sulfate and/or calcium sulfite or magnesium sulfate and/or magnesium sulfite. In this case, when the withdrawn water is sprayed and evaporated completely, the contained ratio of these salts to the main byproduct, i.e., ammonium compounds is higher. Therefore, it is desirable that pH of the recirculating cooling water is in the range of 1 to 7, preferably 1 to 6.

If the alkaline compounds such as ammonia, sodium compounds, potassium compounds, calcium compounds or magnesium compounds are added to the withdrawn water, the problems expected when the alkaline compounds are added to the recirculating cooling water explained above do not occur. However, if a surplus amount of alkaline compounds is added to the withdrawn water, and the withdrawn water is made strongly alkaline, calcium or magnesium originally contained in the water supplied from the water supply source causes scaling in the secondary gas cooling section, and may cause clogging. Therefore, if alkaline compounds are added to the withdrawn water, it is desirable to adjust pH of the withdrawn water in the range of 1 to 8, preferably from 1 to 7.

In case of filtering the withdrawn water, if necessary, pH of the withdrawn water is adjusted, and in such a case also, it is desirable that pH of the withdrawn water is in the range of 1 to 8, preferably 1 to 7.

When ammonia, sodium compounds or potassium compounds are added, if soft water is prepared by removing calcium and magnesium and is used as make-up water for the recirculating cooling water, the withdrawn water does not contain calcium and magnesium to thus prevent scaling and clogging.

As an intermediate gas cooling system between a complete evaporating type cooling tower and a water recirculating type cooling tower, a system in which water is sprayed in the cooling tower, and unevaporated water is not used in recirculation and is withdrawn may be considered. In such a system also, if the amount of the withdrawn water is less than the amount of water required for the secondary gas cooling, the withdrawn water, to which water is added, if necessary, can be used for the secondary gas cooling. This system also makes it possible to prevent generation of waste water. If the amount of the withdrawn water is more than that required for the secondary gas cooling, a portion of the withdrawn water can be sprayed into the process vessel, and only the remaining portion of the withdrawn water becomes waste water. This is also effective in reducing the amount of waste water.

Figure 3:
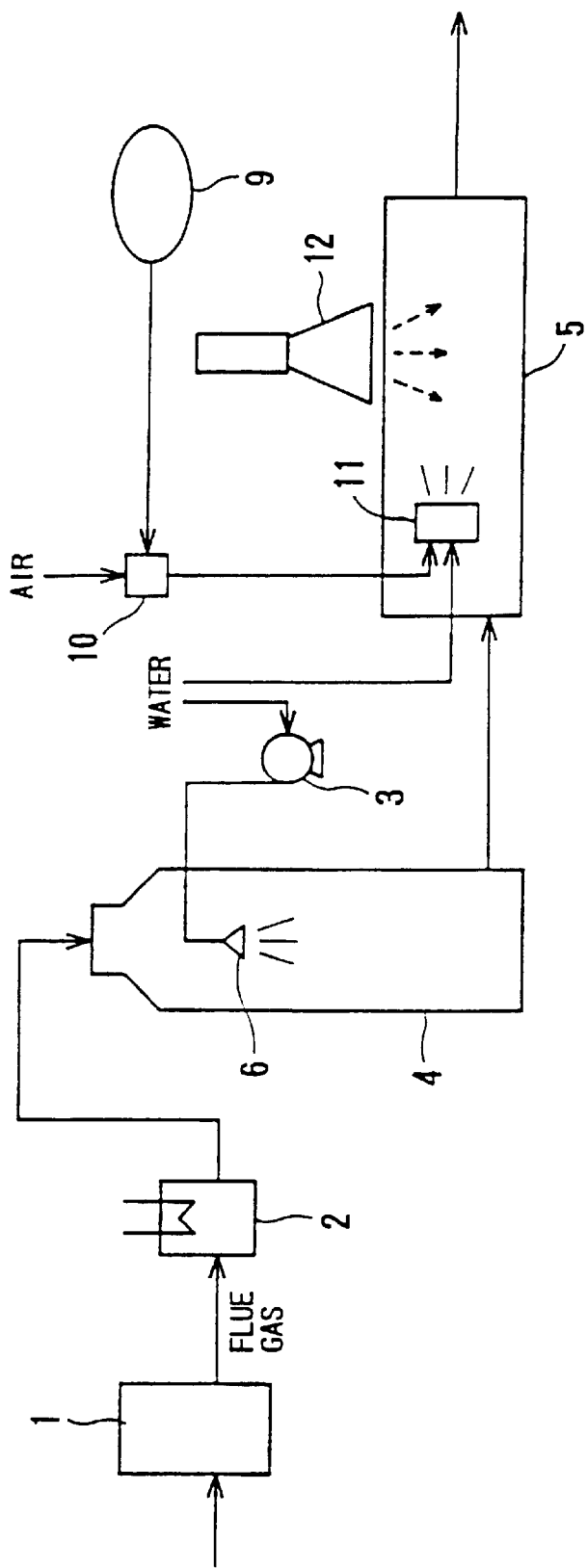
FIG. 3 is a process flow diagram showing a conventional desulfurizing process.

The present invention is explained further according to the following examples which are experimental results carried out by the apparatuses shown in FIGS. 1 and 2 and the apparatus shown in FIG. 3.

REFERENCE EXAMPLE 1

In a reference example as shown in FIG. 3, flue gas of 1,500 m$^3$ N/h containing 850 ppm sulfur oxides and generated by the boiler 1 was cooled to 150° C. by the heat exchanger 2, water supplied by the pump 3 was sprayed by the single-fluid nozzle 6 into the complete evaporating type cooling tower 4 and evaporated completely to cool the gas to 60° C., and then the gas discharged from the cooling tower 4 was introduced into the process vessel 5. Ammonia of 2.3 m$^3$N/h supplied from the ammonia supply equipment 9 was mixed with air of 8.0 m$^3$ N/h in the line mixer 10. The mixed gas and water of 18 kg/h supplied from the water supply source were mixed in the gas-liquid mixing room of the two-fluid nozzle 11, and sprayed at the entrance of the process vessel 5, and the mixture of the gas and water was irradiated with electron beam of 15 kGy from the electron accelerator 12. As a result, the temperature of the gas at the exit of the process vessel 5 was 65° C., and concentration of sulfur oxides was 35 ppm.

In this case, waste water was not generated because it was evaporated completely, but the retention time required to completely evaporate the water sprayed in the complete evaporating type cooling tower was 20 seconds.

EXAMPLE 1

In example 1 shown in FIG. 1, flue gas of 1,500 m$^3$ N/h containing 850 ppm sulfur oxides and generated by the boiler 21 was cooled to 150° C. by the heat exchanger 22. In the water recirculation type cooling tower 24 in which cooling water was recirculated by the recirculation pump 23, the gas was cooled to an adiabatic saturation temperature of 50° C., and then the gas was introduced into the process vessel 25. At this stage, water was withdrawn partially from the recirculating cooling water until the recirculating cooling water obtained pH of 0.5 on the basis of a signal from pH meter 26 set in the recirculation water tank 26. Water was supplied to the recirculation water tank 26 to keep the liquid level in the tank 26 constant on the basis of a signal from the level gauge 28 provided in the tank 26 to thus obtain the withdrawn water of 2.5 kg/h. The withdrawn water of 2.5 kg/h was filtered by the filter 33, and then mixed with water of 7.5 kg/h supplied from the water supply source in the mixing tank 34 to dilute it to pH of 1.1. Ammonia of 2.3 m$^3$ N/h supplied from the ammonia supply equipment 29 was mixed with air of 8.0 m$^3$ N/h in the line mixer 30. The mixed gas and the diluted withdrawn water were mixed in the gas-liquid mixing room of the two-fluid nozzle 31, and sprayed at the entrance of the process vessel 25, and the mixture of the gas and water was irradiated with electron beam of 15 kGy from the electron accelerator 32. As a result, the temperature of the gas at the exit of the process vessel 25 was 65° C., and the concentration of sulfur oxides was 35 ppm.

The withdrawn water from the recirculation water tank 26 was mixed with water supplied from the wafer supply source, sprayed, and evaporated completely in the process vessel 25. No waste water was generated. The retention time in the cooling tower to cool the gas to 50° C. was 0.5 seconds which was significantly shorter than the retention time in the reference example 1 in which the complete evaporating type cooling tower was used. Corrosion of 0.5 mm/year was observed in the water withdrawing line 35 made of carbon steel in which the liquid of pH of 0.5 flowed. However, no corrosion was observed in the secondary cooling water line 36 made of carbon steel in which the liquid of pH of 1.1 after dilution flowed. No corrosion was observed also in the gas cooling section of the cooling tower and the water recirculating line whose liquid contacting surfaces were coated with a resin lining.

EXAMPLE 2

In the same apparatus used in example 1, gas having the same conditions as the gas in example 1 was cooled to the same temperatures by the heat exchanger 22 and the water recirculating type cooling tower 24, respectively, and then the cooled gas was introduced into the process vessel 25. At this stage, the water was withdrawn partially from the recirculating cooling water until the recirculating cooling water had pH of 1.0 on the basis of a signal from pH meter 26. Water was added to keep the liquid level in the recirculating water tank 26 constant on the basis of a signal from the level gauge 28 in the recirculating water tank 26 to thus obtain the withdrawn water of 8 kg/h. The withdrawn water of 8 kg/h was filtered by the filter 33, and then mixed with water of 2 kg/h supplied from the water supply source in the mixing tank 34 to dilute the withdrawn water to pH of 1.1. Ammonia of 2.3 m$^3$ N/h supplied from the ammonia supply equipment 29 was mixed with air of 8.0 m$^3$ N/h in the line mixer 30. The mixed gas and the withdrawn water were mixed in the gas-liquid mixing room of the two-fluid nozzle 31, and sprayed at the entrance of the process vessel 25, and then the mixture of the gas and water was irradiated with electron beam of 15 kGy from the electron accelerator 32. As a result, the temperature of the gas at the exit of the process vessel 25 was 65° C., and the concentration of sulfur oxides was 35 ppm. No waste water was generated as in example 1. The retention time to cool the gas to 50° C. in the cooling tower 24 was 0.5 seconds. No corrosion was observed not only in the secondary cooling water line 36 for the diluted withdrawn water but also in the water withdrawing line 35 for the withdrawn water before dilution with added water.

EXAMPLE 3

In the embodiment as shown in FIG. 2, flue gas of 1,500 m³ N/h containing 2,000 ppm sulfur oxides and generated by the boiler 21 was cooled to 150° C. by the heat exchanger 22, introduced into the water recirculation type cooling tower 24 in which cooling water was recirculated by the recirculating pump 23 to cool the gas to an adiabatic saturation temperature of 50° C., and then introduced into the process vessel 25. At this stage, water was withdrawn partially from the recirculating cooling water until the recirculating cooling water obtained pH of 0.5 on the basis of a signal from pH meter 27 in the recirculating water tank 26. Water from the water supply source was added to keep the liquid level in the recirculating water tank 26 on the basis of a signal from the level gauge 28 in the recirculating water tank 26 to thus obtain the withdrawn water of 10 kg/h. The withdrawn water of 10 kg/h was filtered by the filter 33, and then mixed with water of 14 kg/h in the mixing tank 34. Ammonia was supplied from the ammonia supply equipment 29 to the mixing tank 34 to adjust pH of the withdrawn water to 8.5. Ammonia of 5.4 m³ N/h was mixed with air of 8.0 m³ N/h in the line mixer 30. The mixed gas and the diluted withdrawn water were mixed in the gas-liquid mixing room of the two-fluid nozzle 31, and sprayed at the entrance of the process vessel 25, and then the mixture of the gas and water was irradiated with electron beam of 15 kGy from the electron accelerator 32. As a result, the temperature of the gas at the exit of the process vessel 25 was 65° C., and the concentration of sulfur oxides was 100 ppm. No waste water was generated as in examples 1 and 2. The retention time in the water recirculating type cooling tower was 0.5 seconds. Corrosion of 0.5 mm/year was observed in the water withdrawing line 35 made of carbon steel in which liquid of pH of 0.5 flowed. However, no corrosion was observed in the secondary cooling water line 36 made of carbon steel in which the liquid of pH of 8.5 which has subjected to pH adjustment flowed.

Scaling containing calcium and magnesium as main components occurred in the gas-liquid mixing room of the two-fluid nozzle 31, and finally the nozzle became clogged. After cleaning the two-fluid nozzle 31, the amount of ammonia used for adjustment in the mixing tank 34 was reduced to provide the withdrawn water of pH of 7 at the outlet of the mixing tank 34, and operation was continued. Scaling in the gas-liquid mixing room of the two-fluid nozzle did not occur, and no corrosion was observed in the secondary cooling water line 36 in which the liquid of pH of 7 flowed.

As described above, according to the present invention, the retention time of gas in the cooling tower can be reduced significantly by adoption of the water recirculation system for the primary gas cooling, and generation of waste water is prevented by using the withdrawn water for secondary gas cooling and by evaporating the withdrawn water completely in the process vessel and in the subsequent stage.

By adjusting the amount of water used for the secondary gas cooling, it is possible to prevent an increase of the gas temperature caused by the heat of reaction and/or by the heat generation due to irradiation of electron beam.

Although certain preferred embodiments of the present invention has been shown and described in detail, it should be understood that various changes and modifications may be made therein without departing from the scope of the appended claims.

INDUSTRIAL APPLICABILITY

The present invention is suitable for a flue gas treatment system in which sulfur oxides contained in the combustion flue gas of various fuels such as coal or petroleum can be removed from the gas at a high efficiency.

What is claimed is:

1. A desulfurizing apparatus in which a high temperature gas containing sulfur oxides is processed to remove sulfur oxides by converting the sulfur oxides into ammonium compounds with injection of ammonia, said apparatus comprising;
   a gas cooling device for cooling said high temperature gas by contacting said high temperature gas with recirculating cooling water to obtain a cooled gas;
   means for recirculating cooling water from a recirculation water tank to said gas cooling device;
   an ammonia injecting device for injecting ammonia into said cooled gas; and
   a spraying device located upstream of, at the same position as, or downstream of said ammonia injecting device, for spraying water withdrawn partially from said recirculation water tank, or water withdrawn from said recirculation water tank that is diluted with water into said cooled gas.

2. The desulfurizing apparatus according to claim 1, further comprising a filtering device for filtering said water withdrawn partially from said recirculating cooling water.

3. The desulfurizing apparatus according to claim 1, further comprising an electron accelerator for irradiating said cooled gas with electron beam after injection of ammonia into said cooled gas.

4. A desulfurizing apparatus in which a high temperature gas containing sulfur oxides is processed to remove sulfur oxides by converting the sulfur oxides into ammonium compounds with injection of ammonia, said apparatus comprising:
   a gas cooling device for cooling said high temperature gas by contacting said high temperature gas with recirculating cooling water to obtain a cooled gas;
   means for recirculating cooling water from a recirculation water tank to said gas cooling device;
   a mixing device for mixing ammonia with water withdrawn partially from said recirculation water tank, or with water withdrawn from said recirculation water tank that is diluted with water; and
   a spraying device for spraying a mixture of ammonia and said withdrawn water or a mixture of ammonia and diluted withdrawn water into said cooled gas.

5. The desulfurizing apparatus according to claim 4, further comprising a filtering device for filtering said water withdrawn from said recirculating cooling water.

6. The desulfurizing apparatus according to claim 4, further comprising an electron accelerator for irradiating said cooled gas with electron beam after injection of ammonia into said cooled gas.

7. A desulfurizing apparatus in which a high temperature gas containing sulfur oxides is processed to remove sulfur oxides by converting the sulfur oxides into ammonium compounds with injection of ammonia, said apparatus comprising:

a gas cooling device for cooling said high temperature gas by contacting said high temperature gas with recirculating cooling water to obtain a cooled gas;

means for recirculating cooling water from a recirculation water tank to said gas cooling device;

a gas-liquid mixture spraying device for mixing ammonia or a mixture of ammonia and air, with water withdrawn partially from said recirculation water tank or water withdrawn from said recirculation water tank that is diluted with water and spraying a gas-liquid mixture produced by said mixing into said cooled gas.

8. The desulfurizing apparatus according to claim 7, further comprising a filtering device for filtering said water withdrawn from said recirculating cooling water.

9. The desulfurizing apparatus according to claim 7, further comprising an electron accelerator for irradiating said cooled gas with electron beam after injection of ammonia into said cooled gas.

* * * * *